July 12, 1960 J. G. WRIGHT ET AL 2,944,758
WIRE PACKAGE AND SUPPORT
Filed June 15, 1956 2 Sheets-Sheet 1

INVENTORS
JOHN G. WRIGHT,
JAMES M. CHAFIN &
GEORGE M. WYNN
BY Parrott & Richards
ATTORNEYS

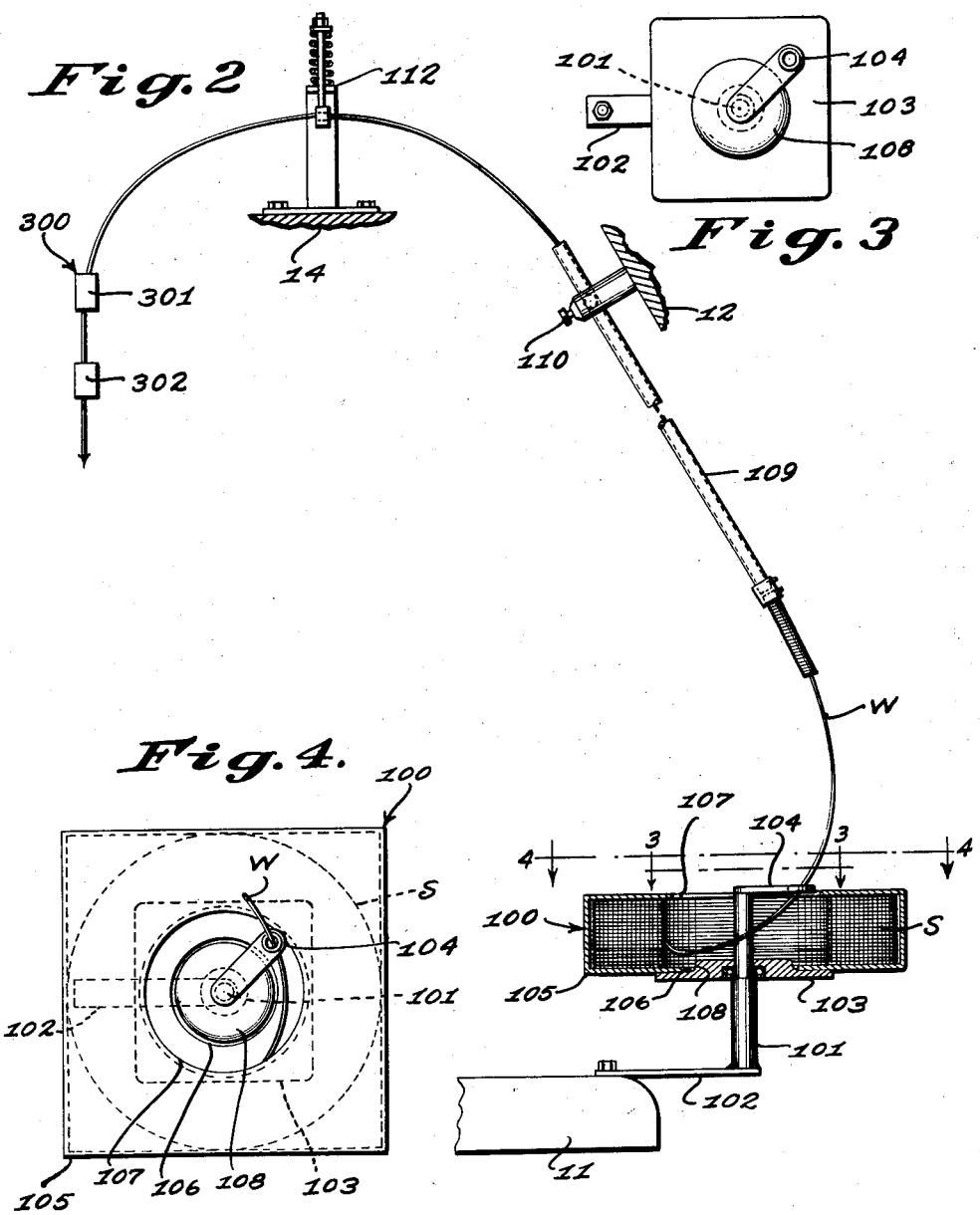

United States Patent Office 2,944,758
Patented July 12, 1960

2,944,758

WIRE PACKAGE AND SUPPORT

John G. Wright, James M. Chafin, and George M. Wynn, Atlanta, Ga., assignors to The Auto-Soler Company, a corporation of Georgia Filed June 15, 1956, Ser. No. 591,680

3 Claims. (Cl. 242—129)

This invention relates in general to fastener forming and inserting machines of the type arranged for forming fasteners from a continuous length of wire and inserting the fasteners formed in material to be secured, and more specifically to a machine of this sort arranged to particular advantage for handling relatively heavy wire, and for forming therefrom and inserting relatively heavy fasteners.

For this purpose, the present invention provides an especially effective and convenient arrangement for supplying wire to the fastener forming means that allows the wire supply, which, being heavy, is exhausted more rapidly than usual, to be renewed easily and quickly; a wire feeding means for withdrawing wire from the supply and delivering it to the fastener forming means that incorporates wire gripping blades arranged uniquely to handle the heavy wire; and an improved means for following the fastener forming motion and actuating the return of the heavy duty fastener forming means required for the heavy wire being handled.

The two latter features noted above are, respectively, disclosed further and claimed in divisional applications Serial No. 733,222, filed April 14, 1958, and Serial No. 733,221, filed April 14, 1958; while the wire supply arrangement is described in detail below in connection with the accompanying drawings, in which:

Fig. 2 is a more or less diagrammatic illustration of the arrangement of the wire supply dispensing means provided according to the present invention;

Fig. 3 is a plan detail of the mounting means for carrying the wire supply taken substantially at the line 3—3 in Fig. 2 with the wire supply removed; and Fig. 4 is a generally corresponding plan detail with the wire supply in place as seen substantially at the line 4—4 in Fig. 2.

Figure 1:
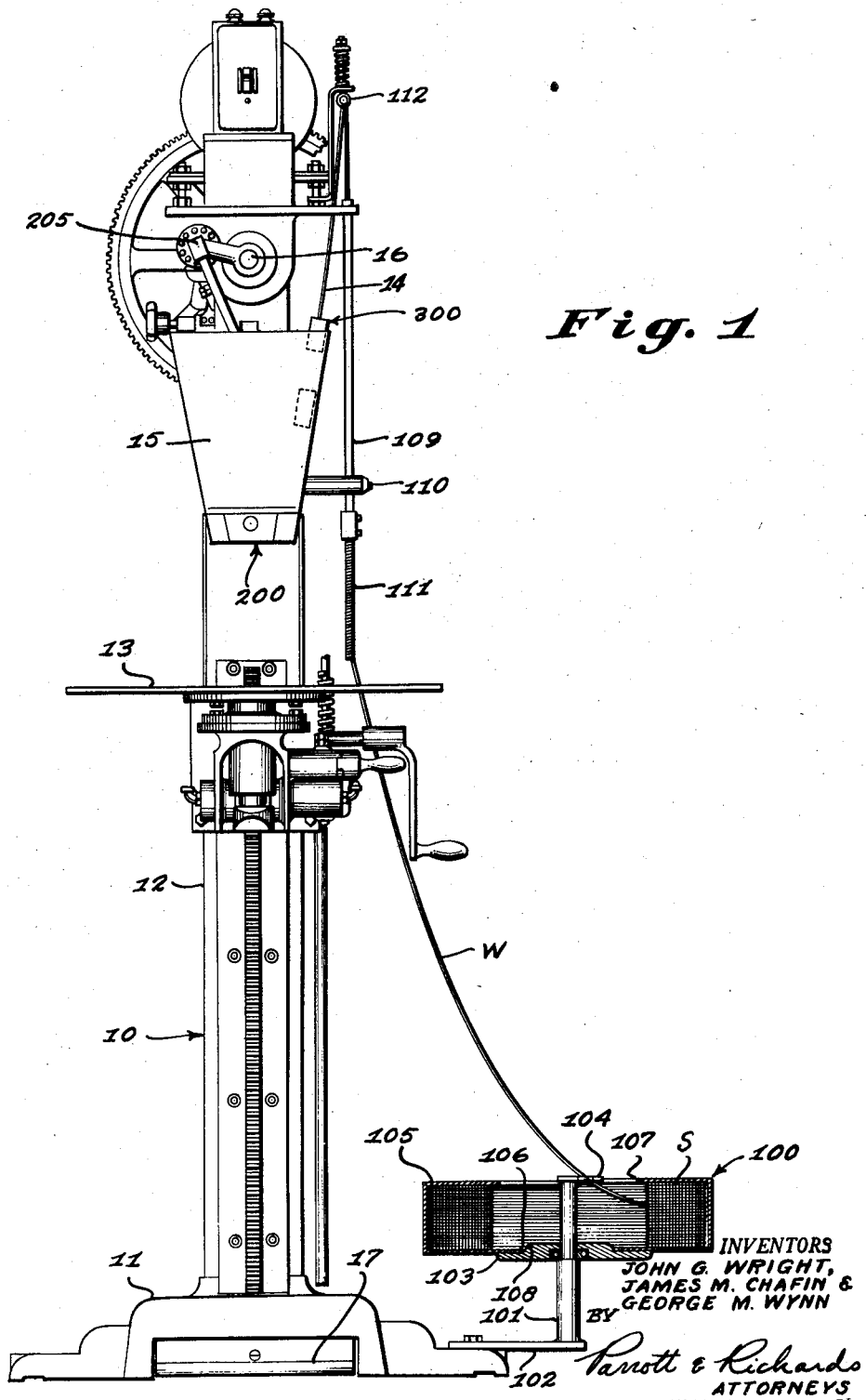
Fig. 1 is a front elevation of a fastener forming and inserting machine arranged in accordance with the present invention.

The fastener forming and inserting machine shown in the drawings, for purposes of illustration, is a machine arranged especially for nailing in wood working operations and the like and follows generally the form of the machine disclosed for this purpose in U.S. Patent No. 2,636,168, but is particularly adapted according to the present invention, as noted above, for handling relatively heavy wire of the order of 13 gauge and for forming therefrom and inserting fasteners in a length of as much as 2¾ inches.

Referring first to Fig. 1 of the drawings, the nailing machine shown comprises generally a frame structure 10 arranged with a base portion 11 adapted to support the machine on a floor or similar surface, a column portion 12 on which a work table structure 13 is carried in the manner disclosed by the above noted prior U.S. Patent No. 2,636,168, and an upper support structure 14 on which an operating head is mounted at 15 above the work table structure 13, together with an operating shaft 16 therefor. Means 100 is arranged at the base portion 11 according to the present invention for dispensing wire W from a coiled supply S so that it may be delivered effectively to a fastener forming and inserting knife assembly 200, carried in the operating head 15, by the action of wire feeding means also arranged in the operating head as indicated generally at 300. The machine is operated from a foot pedal 17 at the frame structure base portion 11 connected through a suitable linkage (not shown), as in the previously noted U.S. Patent No. 2,636,168, to control a clutch mechanism (not shown) on the operating shaft 16 so that a cycle of operation is initiated by each depression of the foot pedal 17.

The wire dispensing means 100 provided by the present invention, and illustrated further in Figs. 2, 3 and 4, comprises a vertical spindle 101 attached at its lower end to the frame structure base portion 11 by means of a bracket arm 102. This vertical spindle 101 is shouldered intermediate its length to carry a turntable 103 for supporting the supply of coiled wire S concentrically with respect to the spindle 101, and has a guide member 104 fixed at its upper extending end for directing the withdrawal of wire W from the inside windings of the coiled supply S.

The supply of coiled wire S is arranged according to the present invention in a packaging carton 105 having both side panels thereof formed with openings 106 and 107, that are substantially concentric with the axis of the wire supply S contained therein, and that are proportioned with a diameter not greater than the inner diameter of the wire supply S. The previously mentioned turntable 103 is in turn formed at its top face with a circular boss portion 108 proportioned in diameter for a positioning fit within one of the carton side panel openings 106, so as to locate the coiled wire supply S more or less concentrically with respect to the spindle 101, with the other carton side panel opening 107 affording clearance for withdrawal of the wire W through the guide member 104 from the inside windings of the coiled supply S.

Initially, the coiled wire supply S may be disposed in the packaging carton 105 with several binding ties (not shown) arranged thereon for maintaining the coil structure in proper order during shipment and storage. Also, the packaging carton 105 may initially have complete side panels with the openings 106 and 107 therein defined by weakened separation lines, so that they may be opened readily while still allowing the packaging carton 105 to be provided initially as a completely closed container for the coiled wire supply S. With this arrangement, all that is necessary to install a coiled wire supply S on the machine is to open the side panels of the packaging carton 105, cut the binding ties on the coiled supply S, fit the packaging carton 105 on the turntable 103 at the side panel opening 106, and train the leading inner end of the wire W through the guide member 104 from the coiled supply S.

After the coiled supply S has been exhausted, the empty packaging carton 105 may be discarded and replaced easily and quickly by a new wire supply S, which affords a substantial operating advantage in handling a heavy wire supply that necessarily becomes exhausted and must be replaced more frequently than is the case with usual wire sizes employed in fastener forming operations of this sort. In addition, the ease with which a new wire supply S may be installed according to the present invention also provides a decided improvement otherwise over the various types of reel mountings that have heretofore been more or less conventional.

It may also be noted that while the top side panel opening 107 in the packaging carton 105 should be proportioned in a diameter approaching the inner diameter of the coiled wire supply S so as to allow adequate clearance for withdrawal of the wire W therethrough, the bottom side panel opening 106 is preferably more restricted in diameter so as to allow for adequate support of the wire supply S on a turntable 103 of reasonable dimensions that may be mounted readily for stable operation on the spindle 101.

Provision for training the wire W from the guide member 104 of the dispensing means 100 to the fastener forming knife assembly 200 in the operating head 15 is made by means of a wire guide tube 109 carried on the frame structure column portion 12 at 110. This wire guide tube 109 is fitted at its entrance end with a length of flexible wire tubing 111 to provide for receiving the wire W readily therein, and is angled toward its discharge end for allowing the wire W to be further trained through a shock absorber unit 112 before being delivered to the fastener forming knife assembly 200 by the wire feed means 300.

The present invention has been described in detail above for purposes of illustration only and is not intended to be limited by this description or otherwise except as defined in the appended claims.

We claim:
1. Means for mounting a supply of coiled wire for dispensing, said means comprising a packaging carton containing said supply of coiled wire, said carton having openings formed in each of opposite sides thereof substantially concentric with the axis of said coiled wire contained in said carton and said openings being proportioned with a diameter not greater than the inner diameter of said coiled wire, a fixed vertical spindle, a turntable mounted for free rotation on said spindle intermediate the length thereof, said turntable having a circular boss formed on the top face thereof concentric with said spindle and proportioned in diameter for a positioning fit to engage the periphery of one of the side openings in said carton and thereby locate and hold said carton concentrically on said turntable, and a guide member fixed at the upper end of said spindle for directing the withdrawal of wire through the other side opening in said carton from the inside windings of said coiled supply.

2. In a fastener forming and inserting machine adapted for forming fasteners from a continuous length of wire and inserting said fasteners in material to be secured, means for supplying relatively heavy wire for forming therefrom and inserting relatively heavy fasteners, said means comprising a packaging carton containing a coiled supply of said relatively heavy wire, said carton having respective openings formed in each of opposite sides thereof substantially concentric with the axis of said coiled wire contained therein and said openings being proportioned with a diameter not greater than the inner diameter of said coiled wire supply, a fixed vertical spindle mounted on said machine, a turn table mounted for free rotation on said spindle intermediate the length thereof, said turn table having a circular boss formed on the top face thereof concentric with said spindle and proportioned in diameter for a positioning fit to engage the periphery of one of the side openings in said carton and thereby locate and hold said carton concentrically on said turn table, and a guide member fixed at the upper end of said spindle for directing the withdrawal of wire through the other side opening of said carton from the inside windings of said coiled supply, whereby said packaged supply of coiled wire needs only to be laid on said turn table for positioning concentrically with respect to said spindle and to have the leading inner winding end of said wire arranged for withdrawal direction by said guide member in order to dispose said coiled wire supply on said machine for dispensing to feed the fastener forming and inserting operations thereof.

3. The means defined in claim 1 and further characterized in that the openings formed in each of opposite sides of said carton are initially defined by weakened separation lines in said carton sides, whereby said openings may be readily formed in said sides while still allowing said carton to be provided initially as a completely closed packaging container for said supply of coiled wire.

References Cited in the file of this patent
UNITED STATES PATENTS

| Re. 9,605 | Palmer | Mar. 15, 1881 |
| 187,271 | Haight | Feb. 13, 1877 |
| 537,972 | Gorse | Apr. 23, 1895 |
| 669,828 | Gornston | Mar. 12, 1901 |
| 736,825 | Cutter | Aug. 18, 1903 |
| 849,672 | Frantz | Apr. 9, 1907 |
| 958,201 | Weber | May 17, 1910 |
| 1,341,479 | Proulx | May 25, 1920 |
| 1,846,524 | Lindsay | Feb. 23, 1932 |
| 2,102,610 | Blashill | Dec. 21, 1937 |
| 2,574,455 | Abbott | Nov. 13, 1951 |
| 2,620,997 | Lyon | Dec. 9, 1952 |
| 2,621,868 | Clark et al. | Dec. 16, 1952 |
| 2,636,168 | Wright | Apr. 28, 1953 |
| 2,643,075 | Moore | June 23, 1953 |
| 2,684,490 | Wright | July 27, 1954 |
| 2,727,703 | Bonnett | Dec. 20, 1955 |
| 2,752,108 | Richardson | June 26, 1956 |
| 2,793,823 | Lipe | May 28, 1957 |
| 2,797,056 | Smetana | June 25, 1957 |

FOREIGN PATENTS

| 546,893 | Great Britain | Aug. 4, 1942 |